Oct. 10, 1933.  V. AUTIER  1,929,733
TIGHTNESS DEVICE
Filed Oct. 5, 1931  2 Sheets-Sheet 2

Inventor:
Victor Autier
By Emil Bönnelycke Attorney

Patented Oct. 10, 1933

1,929,733

UNITED STATES PATENT OFFICE 1,929,733

TIGHTNESS DEVICE

Victor Autier, Lille, France

Application October 5, 1931, Serial No. 567,033, and in France October 15, 1930

4 Claims. (Cl. 286—1)

The present invention relates to a tightness device allowing a movable element to extend through a wall, and adapted to separate two spaces or chambers having between them a difference of pressure.

For this purpose it has been the custom to employ yielding packing or metallic packing. However, the yielding packing, such as a stuffing-box, owing to the great pressure exerted upon it in order to prevent leakage, produces a great friction upon the movable part, which may have a prejudicial effect, and on the other hand, the device must be frequently replaced. As concerns the metallic packing devices, such as piston rings, they are of large size and thus occupy a considerable space, and also require a most accurate construction as well as an abundant lubrication to prevent seizing.

The present invention obviates all such drawbacks, employing for the purpose a metallic packing device consisting of a plurality of sleeves or sockets of reduced thickness, which are adapted to enter one another, a certain number of the sleeves being secured at the ends to the wall to be traversed, whilst the others, respectively inserted between the former, are secured to the movable element, such as a rod or piston. In this manner, a fixed sleeve is situated between two movable sleeves, and inversely.

In the case of stationary packing devices, the fluid must circulate downwardly and upwardly, or inversely, through all the sleeves in succession, and the pressure of the fluid is sufficiently reduced in order that it will not escape to the exterior.

When the device is applied to a piston operating in a cylinder, such sleeves will form around the piston a certain number of annular chambers of variable volume, in which, during the rise of the piston, will be produced high compressions by which the piston will be made leakless without requiring such a complicated operation as grinding in place.

Figure 1:
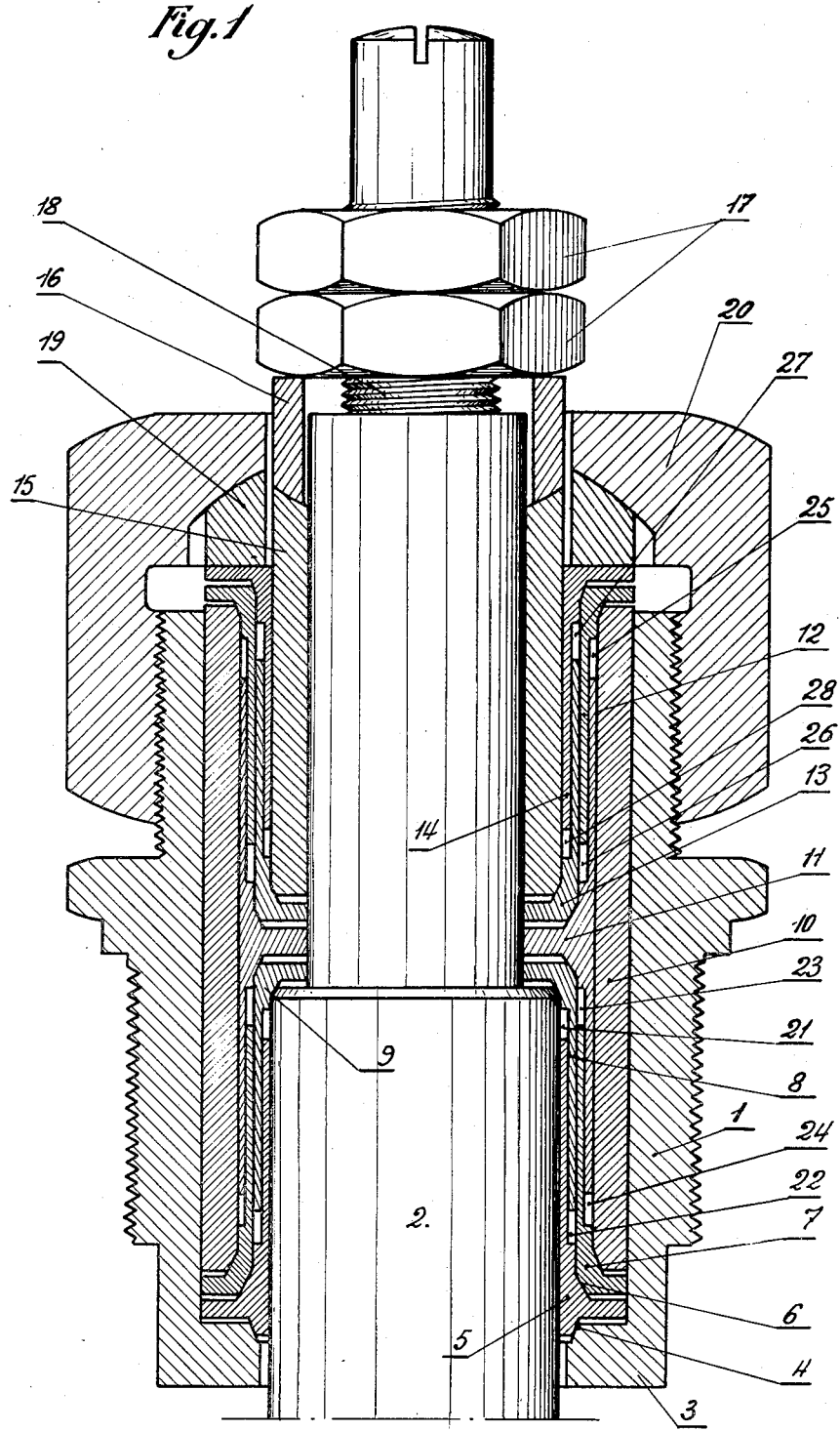
Figure 1 is a sectional view of the packing device.
Figure 2:
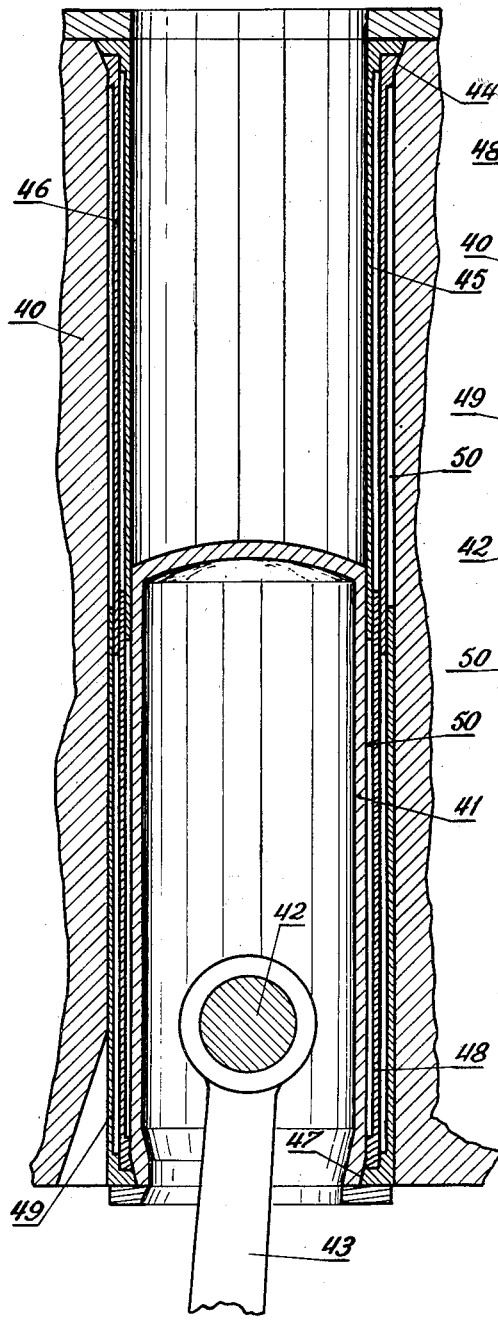
Figure 2 is a sectional view of an engine cylinder and piston shown at the lower dead center and comprising the said device.

In Figure 1, 1 is the cage or outer casing of the packing device, which is mounted in a wall situated between two spaces between which a high pressure prevails. It may thus be supposed that the lower part of the figure is subjected to a high pressure whilst the upper part is in the free atmosphere. In the said casing is situated a movable member 2, which is herein a slidable cylindrical rod.

Between the casing and said movable member is interposed a packing device in conformity to the invention, consisting of seven sleeves or sockets contained one within the other and mounted in two superposed sets, these being alternately secured to said casing and to the movable member 2.

In Figure 1, for the sake of clearness, the stationary parts are hatched in one manner, while the members secured to the movable member 2 are shown in other hatching.

As observed at the lower part of the figure, a suitable flange 3 of the casing 1 supports, by means of a tapered end 4, the first sleeve or socket 5 which is fitted upon the movable member 2 closely but without much friction. The sleeve 5 supports, by a tapered part 6, a second sleeve 7, and between the sleeves 5 and 7 is inserted, closely but without much friction, a socket 8 which is in contact, by a tapered part 9, with the movable member 2. The tapered part of the sleeve 7 is in contact with the lower part of a ring 10, and between the sleeve 7 and the ring 10 is a sleeve 11 secured to the movable member 2.

At the upper part of the casing 1, the same arrangement of sleeves is employed, wherein the sleeve 11 contains a fixed sleeve 12, followed by a movable sleeve 13 and a fixed sleeve 14. The sleeves 12—14, and 11—13 are respectively in contact with one another by tapered parts. The sleeve 13 supports an internal ring 15 which is subject to pressure through the medium of a ring or washer 16 with a rounded bottom, and of one or more nuts 17 engaged upon a threaded part 18 of the movable member 2. A nut 20, engaging the casing 1, presses-through the medium of a ring 19 with a rounded bottom, upon the fixed sleeves 14—12—7—5.

As shown in Figure 1, the sleeves or sockets do not extend to the bottom parts of one another, and they thus leave small spaces 21, 22, 23, etc., and these spaces allow the member 2 to move with reference to the fixed members.

The operation of the apparatus is as follows:

If it be supposed that the pressure is exercised at the lower part of Figure 1, the leaking fluid, which cannot pass by the tapered part 4 which is strongly pressed, will proceed between the movable member 2 and the first fixed sleeve 5, thus reaching the first annular space 21, in which it expands before circulating between the movable sleeve 5 and the sleeve 8 secured to the movable member. The fluid thus enters the space 22 in which it again expands, and it then passes between the two sleeves 8 and 7 and enters the spaces 23 and 24, after which it proceeds along the ring 10 and into the space 25, and thence into the spaces 26—27—28.

Thus before it escapes from the space 28 to the exterior, between the sleeve 14 and the ring 15, the fluid is obliged to follow a very winding path, in which it is subject to eight successive expansions. These conditions are such that there will be practically no leakage.

However, it will be readily observed that each sleeve is subjected to different pressures upon its faces, so that each sleeve will tend to expand and thus make close contact with the inner periphery of the sleeve which contains it, and in this manner each sleeve acts against the leakage of the fluid and is fitted in place by its own action. For this reason, it will not be required, during the manufacture of the apparatus, to obtain a tight fit between the sleeves, and a clearance of $\frac{1}{10}$ millimeter can be readily allowed.

As the sleeves form superposed groups, the said apparatus will occupy but a small space, and on the other hand, as there is a certain clearance between the sleeves, there will be no wear of such sleeves, and the friction of the parts is very small, so that the movable member 2 may form part of any apparatus, while it is most responsive in its action. In the construction shown in Figures 2 to 4, 40 is a section of the cylinder of a motor or compressor, containing a piston 41 pivoted on an axle 42 and thus cooperating with a connecting rod 43 attached to a crank, not shown. As the upper part of the cylinder are mounted—by tapered or like ends 44—two metallic sleeves 45—46 corresponding to somewhat more than one-half the stroke of the piston, and forming with the wall of the cylinder or between one another, cylindrical chambers 50.

At the lower part of the piston are mounted, by tapered ends 47, two concentric sleeves 48—49 forming in like manner with the piston, or between one another, two cylindrical chambers.

The four sleeves 45—46—48—49 of the device enter partially into one another, as observed in the figures, and thus, when proceeding from the interior to the exterior, one first finds the fixed sleeve 45, then the movable sleeve 48, the fixed sleeve 46, and the sleeve 49 which is in contact by its surface with the wall of the cylinder 40.

Figure 3:
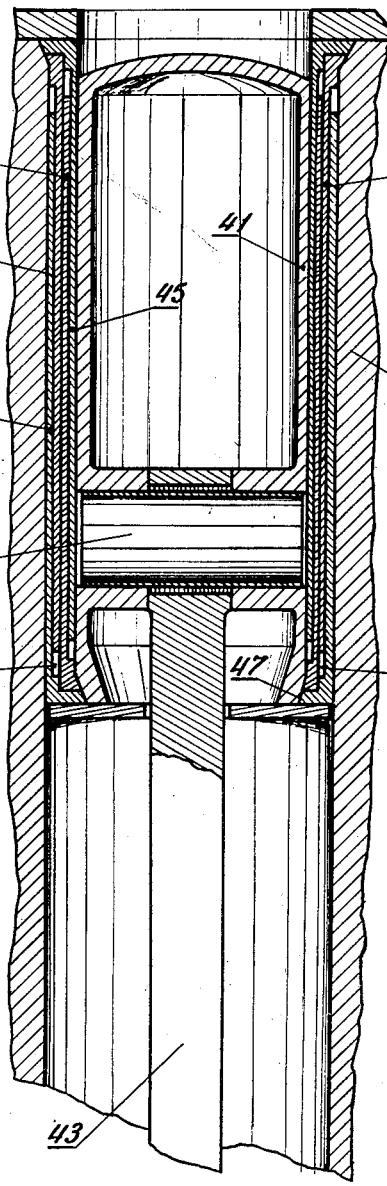
Figure 3 is a like section, taken at right-angles from the preceding, with the piston at the upper dead center.
Figure 4:
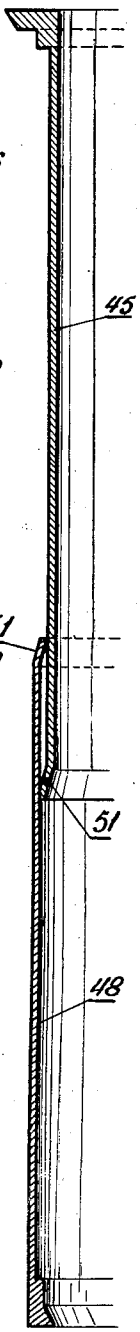
Figure 4 is a detail section of two sleeves pertaining to the device.

The operation of the device will be observed with reference to Figure 3.

When the piston is at its upper dead center, the cylindrical chambers 50 between two sleeves have a very small size, and thus during the up stroke of the piston, a great compression will be produced in the cylindrical chambers, which may readily attain twenty times the initial pressure.

As in the cylinder of an ordinary engine or compressor, the compression is of the order of five, there will be produced in the chambers 50 a great extra compression, and hence the piston will be made entirely leakless.

As the said sleeves have but a small thickness and are subjected to different pressures upon their faces they will tend, by their elasticity, to assume the form of regular cones on the side having the smaller pressure, so that they will separate slightly from one another, thus greatly reducing the friction to an almost negligible degree, whereby all risk of wear is obviated. This effect is shown chiefly in Figure 4, in which the distortion at 51 is much exaggerated for the sake of clearness.

It is evident on the other hand that the manufacture of such sleeves will not require any very great accuracy in the construction, or at all events this will be much below what is required for the usual piston rings.

Due to the exact guiding of the piston, the irregular wear of the cylinder will be much less that in the known arrangements.

I claim:

1. A device adapted to be positioned between an immovable pressure-sustaining wall and a reciprocating element movable through an opening in the wall, comprising an open-ended sleeve surrounding and spaced from the movable element, said sleeve being secured intermediate its ends to the reciprocating element, a sleeve concentric with and extending into each open end of the sleeve secured to the reciprocating element and fixed to the pressure-sustaining wall, said sleeves fixed to the wall being positioned in the space between the reciprocating element and the open-ended sleeve carried thereby to provide a fluid-tight joint between the wall and the reciprocating element.

2. A device adapted to be positioned between an immovable pressure-sustaining wall and a reciprocating element movable through an opening in the wall, comprising an open-ended sleeve surrounding and spaced from the movable element, said sleeve being secured intermediate its ends to the reciprocating element, a sleeve concentric with and extending into each open end of the sleeve secured to the reciprocating element and fixed to the pressure-sustaining wall, said sleeves fixed to the wall being positioned in the space between the reciprocating element and the open-ended sleeve carried thereby to provide a fluid-tight joint between the wall and the reciprocating element, said sleeves being formed of thin elastic material susceptible to deformation under fluid pressure to provide a fluid-tight joint.

3. A device adapted to be positioned between an immovable pressure-sustaining wall and a reciprocating element movable through an opening in the wall, comprising an open-ended sleeve surrounding and spaced from the movable element, said sleeve being secured intermediate its ends to the reciprocating element, a sleeve concentric with and extending into each open end of the sleeve secured to the reciprocating element and fixed to the pressure-sustaining wall, said sleeves fixed to the wall being positioned in the space between the reciprocating element and the open-ended sleeve carried thereby, sleeves fixed to the reciprocating element and lying between the reciprocating element and the sleeves fixed to the wall, and additional sleeves fixed to the wall and lying between the reciprocating element and the innermost sleeves carried thereby, all of said sleeves cooperating to provide a fluid-tight joint.

4. A device adapted to be positioned between an immovable pressure-sustaining wall and a reciprocating element movable through an opening in the wall, comprising an open-ended sleeve surrounding and spaced from the movable element, said sleeve being secured intermediate its ends to the reciprocating element, a sleeve concentric with and extending into each open end of the sleeve secured to the reciprocating element and fixed to the pressure-sustaining wall, said sleeves fixed to the wall being positioned in the space between the reciprocating element and the open-ended sleeve carried thereby, sleeves fixed to the reciprocating element and lying between the reciprocating element and the sleeves fixed to the wall, and additional sleeves fixed to the wall and lying between the reciprocating element and the innermost sleeves carried thereby, said sleeves being formed of thin elastic material deformable under fluid pressure to provide a fluid-tight joint between the sleeves.

VICTOR AUTIER.